United States Patent
Hsin et al.

(10) Patent No.: US 9,473,962 B2
(45) Date of Patent: Oct. 18, 2016

(54) WIRELESS TRANSMISSION RATE ADJUSTMENT METHOD

(71) Applicant: REALTEK SEMICONDUCTOR CORPORATION, Hsinchu (TW)

(72) Inventors: Chien-Wei Hsin, Kaohsiung (TW); Wei-Hsuan Chang, Taipei (TW); Chung-Yao Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 351 days.

(21) Appl. No.: 14/095,679

(22) Filed: Dec. 3, 2013

(65) Prior Publication Data

US 2014/0169195 A1    Jun. 19, 2014

(30) Foreign Application Priority Data

Dec. 14, 2012 (TW) .............................. 101147457 A

(51) Int. Cl.
*H04W 24/06* (2009.01)
*H04W 72/08* (2009.01)

(52) U.S. Cl.
CPC ........... *H04W 24/06* (2013.01); *H04W 72/085* (2013.01)

(58) Field of Classification Search
CPC ............. H04W 24/06; H04W 72/085; H04W 28/0236; H04W 28/046; H04B 7/264; H04B 7/2659; H04L 1/0002; H04L 1/0003
See application file for complete search history.

(56) References Cited

U.S. PATENT DOCUMENTS 7,206,332 B2    4/2007 Kwan et al.
8,576,737 B1 *  11/2013 Shetty et al. ......... H04L 1/0002
                                                    370/252

(Continued)

FOREIGN PATENT DOCUMENTS

| CN | 1520643   | 8/2004  |
|----|-----------|---------|
| TW | 200926707 | 6/2009  |
| TW | 201038000 | 10/2010 |

OTHER PUBLICATIONS

Office Action issued on Sep. 25, 2014 by TIPO for the counterpart TW Patent Application No. 101147457 cites CN 1520643, TW 200926707 and TW 201038000.

(Continued)

*Primary Examiner* — Habte Mered
(74) *Attorney, Agent, or Firm* — WPAT, P.C., Intellectual Property Attorneys; Anthony King

(57) ABSTRACT

The present invention discloses a wireless transmission rate adjustment method for adjusting the wireless transmission rate of a wireless transmission device. The method comprises: having the wireless transmission device enter a try state from a normal state; under the try state, transmitting a plurality of test packets according to a first modulation and coding scheme (MCS) and determining whether the transmission is successful in accordance with a predetermined condition; if the transmission is successful with the first MCS, returning to the normal state and transmitting data with the first MCS; if the transmission is unsuccessful with the first MCS, staying in the try state and transmitting a plurality of test packets according to a second MCS, and then determining whether the transmission is successful in accordance with the predetermined condition; if the transmission is successful with the second MCS, returning to the normal state and transmitting data with the second MCS; and if the transmission is failed with the second MCS, returning to the normal state and transmitting data at an original transmission rate or with the first MCS.

8 Claims, 9 Drawing Sheets

(56) References Cited

U.S. PATENT DOCUMENTS

| | | | |
|---|---|---|---|
| 8,798,022 B1* | 8/2014 | Aragon | H04B 7/26 370/206 |
| 2004/0095960 A1* | 5/2004 | Attar et al. | H04L 1/0002 370/468 |
| 2004/0165575 A1* | 8/2004 | Yang et al. | H04L 1/0002 370/349 |
| 2006/0198305 A1* | 9/2006 | Hamdi | H04L 41/12 370/232 |
| 2007/0214247 A1* | 9/2007 | Yang et al. | H04L 12/66 709/223 |
| 2008/0317014 A1* | 12/2008 | Veselinovic et al. | H04L 1/0001 370/380 |
| 2011/0305209 A1* | 12/2011 | Merlin et al. | H04L 1/0001 370/329 |
| 2012/0276896 A1* | 11/2012 | Ren et al. | H04L 1/0003 455/423 |
| 2013/0250904 A1* | 9/2013 | Kang et al. | H04B 7/0452 370/329 |

OTHER PUBLICATIONS

English Abstract of Office Action issued on Sep. 25, 2014 by TIPO for the counterpart TW Patent Application No. 101147457.
U.S. Pat. No. 7206332 corresponds to CN 1520643.

* cited by examiner

| Transmission rate (Mbps) | SS mode | DS mode |
|---|---|---|
| 270.0 | | MCS15 |
| 243.0 | | MCS14 |
| 216.0 | | MCS13 |
| 162.0 | | MCS12 |
| 135.0 | MCS7 | |
| 121.5 | MCS6 | |
| 108.0 | MCS5 | MCS11 |
| 81.0 | MCS4 | MCS10 |
| 54.0 | MCS3 | MCS9 |
| 40.5 | MCS2 | |
| 27.0 | MCS1 | MCS8 |
| 13.5 | MCS0 | |

- - - - -> selecting first MCS
———→ selecting second MCS

Fig. 3

| Transmission rate (Mbps) | SS mode | DS mode |
| --- | --- | --- |
| 270.0 | | MCS15 |
| 243.0 | | MCS14 |
| 216.0 | | MCS13 |
| 162.0 | | MCS12 |
| 135.0 | MCS7 | |
| 121.5 | MCS6 | |
| 108.0 | MCS5 | MCS11 |
| 81.0 | MCS4 | MCS10 |
| 54.0 | MCS3 | MCS9 |
| 40.5 | MCS2 | |
| 27.0 | MCS1 | MCS8 |
| 13.5 | MCS0 | |

Fig. 5

| Rt. Cnt. | Fallback Degree | Fallback Result (Original Rate: MCS#) | Fallback Sequence |
|---|---|---|---|
| 1 | 0 | lower MCS# for 0 ranking | MCS15 |
| 2 | 0 | lower MCS# for 0 ranking | MCS14 |
| 3 | 0 | lower MCS# for 0 ranking | MCS13 |
| 4 | 0 | lower MCS# for 0 ranking | MCS12 |
| 5 | 0 | lower MCS# for 0 ranking | MCS7 |
| 6 | 1 | lower MCS# for 1 ranking | MCS6 |
| 7 | 3 | lower MCS# for 3 ranking | MCS11 |
| 8 | 5 | lower MCS# for 5 ranking | MCS5 |
| . | . | . | MCS10 |
| . | . | . | MCS4 |
| . | . | . | MCS9 |
|   |   |   | MCS3 |
|   |   |   | MCS2 |
|   |   |   | MCS8 |
|   |   |   | MCS1 |
|   |   |   | MCS0 |

Fig. 7a

| Rt. Cnt. | Fallback Degree | Fallback Result (Original Rate: MCS#) | Fallback Sequence |
|---|---|---|---|
| 1 | 0 | lower MCS# for 0 ranking | MCS15 |
| 2 | 1 | lower MCS# for 1 ranking | MCS14 |
| 3 | 2 | lower MCS# for 2 ranking | MCS13 |
| 4 | 4 | lower MCS# for 4 ranking | MCS12 |
| 5 | 6 | lower MCS# for 6 ranking | MCS11 |
| 6 | 8 | lower MCS# for 8 ranking | MCS10 |
| 7 | 9 | lower MCS# for 9 ranking | MCS9 |
| 8 | 10 | lower MCS# for 10 ranking | MCS8 |
| . | . | . | MCS7 |
| . | . | . | MCS6 |
| . | . | . | MCS5 |
|   |   |   | MCS4 |
|   |   |   | MCS3 |
|   |   |   | MCS2 |
|   |   |   | MCS1 |
|   |   |   | MCS0 |

Fig. 7b

WIRELESS TRANSMISSION RATE ADJUSTMENT METHOD

BACKGROUND OF THE INVENTION

1. Field of the Invention

The present invention relates to an adjustment method of a wireless transmission device, especially to a transmission rate adjustment method of a wireless transmission device.

2. Description of Related Art

Wireless transmission devices have been popular these years due to the convenience. Among the wireless transmission devices of different standards, the wireless transmission device in compliance with IEEE 802.11 standard has become the mainstream in short distance transmission applications. As the development of 802.11 standard (from 802.11, 802.11a, 802.11b, . . . , to 802.11n), the wireless transmission device nowadays is faster and supports longer transmission distance in comparison with the outdated products. Taking 802.11n for example, it supports the multiple input multiple output (MIMO) technique, supports multiple transmission rates, and is capable of reaching a transmission rate of 300 Mbps or more (e.g. 600 Mbps). However, not all the environments or equipments can sustain such high transmission rates. In a proper condition, a wireless transmission device complying with 802.11 standard can speed up to raise the transmission rate; however, in an improper condition, the wireless transmission device has to speed down to make sure that the data can be sent successfully.

A traditional rate adjustment method is carried out in accordance with the transmission status of a wireless transmission channel. The transmission status, for example, could be a packet retransmission count, a received signal strength indicator (RSSI) or a signal to noise ratio (SNR). Because traditional 802.11a/b/g standards do not support the MIMO technique but support the transmission of single spatial stream (SS), to a 802.11a/b/g wireless transmission device or a 802.11n wireless transmission device only using the transmission of single spatial stream, the rate adjustment of the current art is executed merely by the speed order of transmission rates or the order of modulation and coding schemes (MCSs). However, to a wireless transmission device using two or more spatial streams for transmission, the rate adjustment of the current art will no longer be enough. For instance, if a system composed of a wireless transmission device and a reception end is capable of supporting two independent spatial streams, the modulation and coding schemes which the system can support are MCS0 to MCS15 in which MCS0 to MCS7 belong to the schemes of a single spatial stream mode while MCS8 to MCS15 belongs to the schemes of a double spatial stream (DS) mode. Since the order of MCS0 to MCS15 is not completely arranged by their corresponding transmission rates, the aforementioned rate adjustment of the current art will suffer at least the following problems:

First problem: If the optimal transmission rate is MCS11 of the double spatial stream mode (corresponding to the rate of 108.0 Mbps) under the present environment and equipment, assuming that the current transmission rate is MCS0 of the single spatial stream mode (corresponding to the rate of 13.5 Mbps), then in the speed-up process according to the MCS order (i.e. MCS0, MCS1, MCS2 . . . ), MCS4 instead of MCS11 will be the speed-up result because when the transmission rate is sequentially raised to MCS5 of the single spatial stream mode (corresponding to the rate of 108.0 Mbps equal to that of the optimal choice MCS11), the transmission rate will fail due to the higher SNR requirement of the single spatial stream mode. As a result, the scheme MCS4 prior to the unsuccessful scheme MCS5 will be the final result of speed-up, and the optimal rate MCS11 will not be reached.

Second problem: If the environment and equipment on hand only support the transmission under the single spatial stream mode, assuming that the current transmission rate is MCS15 of the double spatial stream mode, then in the speed-down process according to the MCS order (i.e. MCS15, MCS14, MCS13, . . . ), the precedential test of MCS15 to MCS8 will fail because these schemes all belong to the double spatial stream mode. As a result, the test will not be successful until the scheme MCS7 of the single spatial stream mode is adopted, which unavoidably consumes too much time and causes the throughput reduced.

In additional to the above-mentioned problems, the current art will only choose one transmission rate (i.e. a modulation and coding scheme) for test in order to avoid the interference to the data transmission under a normal mode, which consequently stalls off the time for finding the best transmission rate. Besides, the current art can not distinguish the transmission failure due to SNR from the transmission failure due to packet collision, and thus in the collision case the current art may lower the transmission speed unnecessarily, which causes the packet length extended and leads to more serious collision problems. In other words, if the cause of failure is uncertain, the speed-down process can not be done rapidly and properly. Moreover, before speed-up or speed-down, the current art doesn't have an appropriate algorithm in determining an initial transmission rate to accelerate finding the optimal transmission rate.

SUMMARY OF THE INVENTION

In light of the above, a purpose of the present invention is to provide a wireless transmission rate adjustment method to solve problems of the prior art.

Another purpose of the present invention is to provide a wireless transmission rate adjustment method to improve the throughput of a wireless transmission device.

Another purpose of the present invention is to provide a wireless transmission rate adjustment method to decide the bottom transmission rate of a wireless transmission device.

Another purpose of the present invention is to provide a wireless transmission rate adjustment method to adaptively lower the transmission rate of a wireless transmission device.

Another purpose of the present invention is to provide a wireless transmission rate adjustment method to determine the initial transmission rate of a wireless transmission device.

The present invention discloses a wireless transmission rate adjustment method to adjust the wireless transmission rate of a wireless transmission device which is capable of selecting one of several transmission rates to transmit data in which at least one of the several transmission rates corresponds to multiple transmission modes including a first transmission mode and a second transmission mode. According to an embodiment of this invention, the wireless transmission rate adjustment method comprises: having the wireless transmission device enter a try state from a normal state in which the wireless transmission device transmits data at an original transmission rate before entering the try state; under the try state, having the wireless transmission device transmit one or more test packets according to a first modulation and coding scheme (MCS), and determining whether the wireless transmission device transmits the one or more test packets successfully according to a predetermined condition; if the transmission of the one or more test packets is successful with the first MCS, having the wireless transmission device return to the normal state and transmit data with the first MCS; if the transmission of the one or more test packets is unsuccessful with the first MCS, having the wireless transmission device transmit another one or more test packets according to a second MCS in the try state, and determining whether the wireless transmission device transmits the another one or more test packets successfully in accordance with the predetermined condition; if the transmission of the another one or more test packets is successful with the second MCS, having the wireless transmission device return to the normal state and transmit data with the second MCS; and if the transmission of the another one or more test packets is failed with the second MCS, having the wireless transmission device return to the normal state and transmit data at the original transmission rate or with the first MCS, wherein at least one of the transmission rates of the first MCS and the second MCS is different from the original transmission rate.

The present invention also discloses a wireless transmission rate adjustment method to determine the bottom of the transmission rate of a wireless transmission device which is capable of selecting one of several transmission rates to transmit data. According to an embodiment of this invention, the wireless transmission rate adjustment method comprises: determining that a received signal strength indicator measured by the wireless transmission device belongs to a first range, a second range or a third range; if the received signal strength indicator belongs to the first range, making the transmission rate of the wireless transmission device equal to or higher than a first threshold rate; if the received signal strength indicator belongs to the second range, making the transmission rate of the wireless transmission device equal to or higher than a second threshold rate which is lower than the first threshold rate; and if the received signal strength indicator belongs to the third range, making the transmission rate of the wireless transmission device equal to or higher than the lowest rate among the several transmission rates.

The present invention further discloses a wireless transmission rate adjustment method to lower the transmission rate of a wireless transmission device which is capable of selecting one of several transmission rates to transmit data. According to an embodiment of this invention, the wireless transmission rate adjustment method comprises: transmitting a plurality of packets by the wireless transmission device within a predetermined time; using the wireless transmission device to count a packet number N corresponding to a retransmission count less than a number K and a packet number M corresponding to another retransmission count equal to or higher than the number K within the predetermined time in which the packet number N relates to the packets transmitted successfully, the packet number M relates to the packets transmitted successfully or unsuccessfully, and the same packet with any of the retransmission counts consumes one of the packet number N or M; calculating a ratio of the packet number N to the summation of the packet number N and the packet number M; if the ratio is larger than a reference value, selecting a first auto rate fallback table and making the wireless transmission device lower its transmission rate according to the first auto rate fallback table; and if the ratio is less than the reference value, selecting a second auto rate fallback table and making the wireless transmission device lower its transmission rate according to the second auto rate fallback table, wherein the average rate fallback degree of the second auto rate fallback table is higher than the average rate fallback degree of the first auto rate fallback table.

The present invention further discloses a wireless transmission rate adjustment method to determine an initial transmission rate of a wireless transmission device which is capable of selecting one of several transmission rates to transmit data. According to an embodiment of the present invention, the wireless transmission rate adjustment method comprises: setting a plurality of threshold values including a first threshold value corresponding to a first transmission rate of the several transmission rates and a second threshold value corresponding to a second transmission rate of the several transmission rates; comparing a received signal strength indicator detected by the wireless transmission device with the first threshold value, and making the wireless transmission device operate at the first transmission rate if the received signal strength indicator is larger than the first threshold value; and comparing the received signal strength indicator with the second threshold value, and making the wireless transmission device operate at the second transmission rate which is less than the first transmission rate if the received signal strength indicator is between the second threshold value and the first threshold value.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 3 illustrates how the embodiment of FIG. 1 executes a speed-down process.

FIG. 5 illustrates the first, second and third ranges according to the embodiment of FIG. 4.

FIG. 7a illustrates a fallback table according to the embodiment of FIG. 6.

FIG. 7b illustrates another fallback table according to the embodiment of FIG. 6.

DETAILED DESCRIPTION OF THE PREFERRED EMBODIMENTS

The following description uses language by referring to terms of the field of this invention. If any term is defined in the specification, such term should be explained accordingly. Besides, the connection between objects or events in the disclosed embodiments can be direct or indirect provided that these embodiments are still applicable under such connection. The mentioned "indirect" means that an intermediate object or a physical space is existed between the objects, or an intermediate event or a time interval is existed between the events. In addition, the following description relates to wireless transmission, and thus the known detail in this field will be omitted if such detail has little to do with the features of the present invention. Furthermore, the shape, size, and ratio of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention discloses wireless transmission rate adjustment methods. These methods could be carried out by a wireless transmission device which can use any of the methods to determine its wireless transmission rate. Said wireless transmission device can be a device complying with IEEE 802.11 standards, especially a device complying with IEEE 802.11n standard. To be more specific, the wireless transmission device complies with IEEE 802.11 standard and is capable of executing the multiple input multiple output (MIMO) operation; however, this is not a limitation to the present invention, just for people in this field to understand this invention. Provided that the implementation is applicable, people of ordinary skill in the art can choose any appropriate wireless transmission hardware to carry out the present invention or modify the hardware to perform this invention according to the disclosure in the specification without undue effort. Since the present invention is method invention, and the device for carrying out the invention could be already existed, therefore the following description will abridge the hardware details provided that the remained disclosure is still enough for understanding and making use of the present invention.

Figure 1:
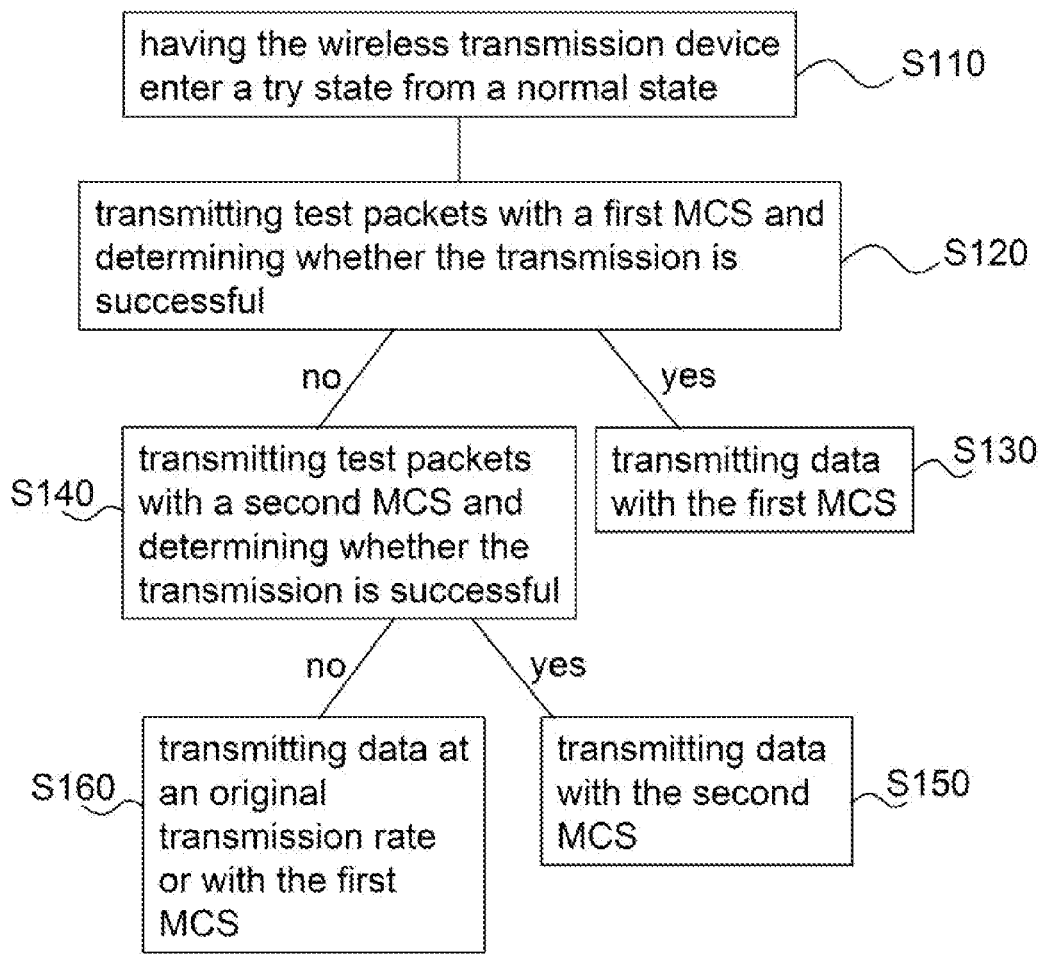
FIG. 1 illustrates the flow chart of an embodiment of the wireless transmission rate adjustment method of this invention.

Please refer to FIG. 1 which illustrates the flow chart of an embodiment of the wireless transmission rate adjustment method of the present invention. This embodiment is applicable to adjusting the transmission rate of a wireless transmission device (e.g. the aforementioned wireless transmission device conforming to IEEE 802.11n standard and capable of executing the MIMO operation). More specifically, it is appropriate for increasing, decreasing or maintaining the wireless transmission rate of the wireless transmission device which is capable of selecting one of several transmission rates (e.g. several physical layer connection rates (PHY rates)) to transmit data. Besides, at least one of the several transmission rates corresponds to a plurality of transmission modes including a first transmission mode (e.g. a double spatial stream (DS) mode or a P spatial stream mode in which P is an integer larger than 2) and a second transmission mode (e.g. a single spatial stream (SS) or a Q spatial stream mode in which Q is an integer larger than 1 but less than P). As shown in FIG. 1, the wireless transmission rate adjustment method of the present embodiment comprises the following steps:

Step S110: having the wireless transmission device enter a try state from a normal state. The wireless transmission device transmits data at an original transmission rate before entering the try state. The data could be packets of aggregate media access control (MAC) protocol data unit (AMPDU) which have larger size in comparison with packets of single MAC protocol data unit (single MPDU); however, this is merely for understanding, not a limitation to the invention.

Step S120: under the try state, having the wireless transmission device transmit one or more test packets (e.g. packets of single MPDU) according to a first modulation and coding scheme (MCS), and determining whether the wireless transmission device transmits the one or more test packets successfully according to a predetermined condition (e.g. a constant or adjustable predetermined retransmission count). Said first MCS corresponds to a transmission rate equal to or different from the original transmission rate; and since the packets of single MPDU have the data amount less than that of the packets of AMPDU, the delivery of the one or more test packets has little to do with the overall throughput of the wireless transmission device.

Step S130: in light of Step S120, if the transmission of the one or more test packets is successful with the first MCS, having the wireless transmission device return to the normal state and transmit data with the first MCS.

Step S140: in light of Step S120, if the transmission of the one or more test packets is unsuccessful with the first MCS, having the wireless transmission device transmit another one or more test packets according to a second MCS in the try state, and determining whether the wireless transmission device transmits the another one or more test packets successfully by the predetermined condition. Said second MCS corresponds to a transmission rate distinct from the original transmission rate; in another word, the transmission rate of the second MCS is higher or lower than the original transmission rate. To be more specific, if the transmission rate of the first MCS is equal to or lower than the original transmission rate, the transmission rate of the second MCS will be lower than the original transmission rate. On the contrary, if the transmission rate of the first MCS is equal to or higher than the original transmission rate, the transmission rate of the second MCS will be higher than the original transmission rate.

Step S150: in light of Step S140, if the transmission of the another one or more test packets is successful with the second MCS, having the wireless transmission device return to the normal state and transmit data with the second MCS.

Step S160: in light of Step S140, if the transmission of the another one or more test packets is failed with the second MCS, having the wireless transmission device return to the normal state and transmit data at the original transmission rate or with the first MCS.

Figure 2:
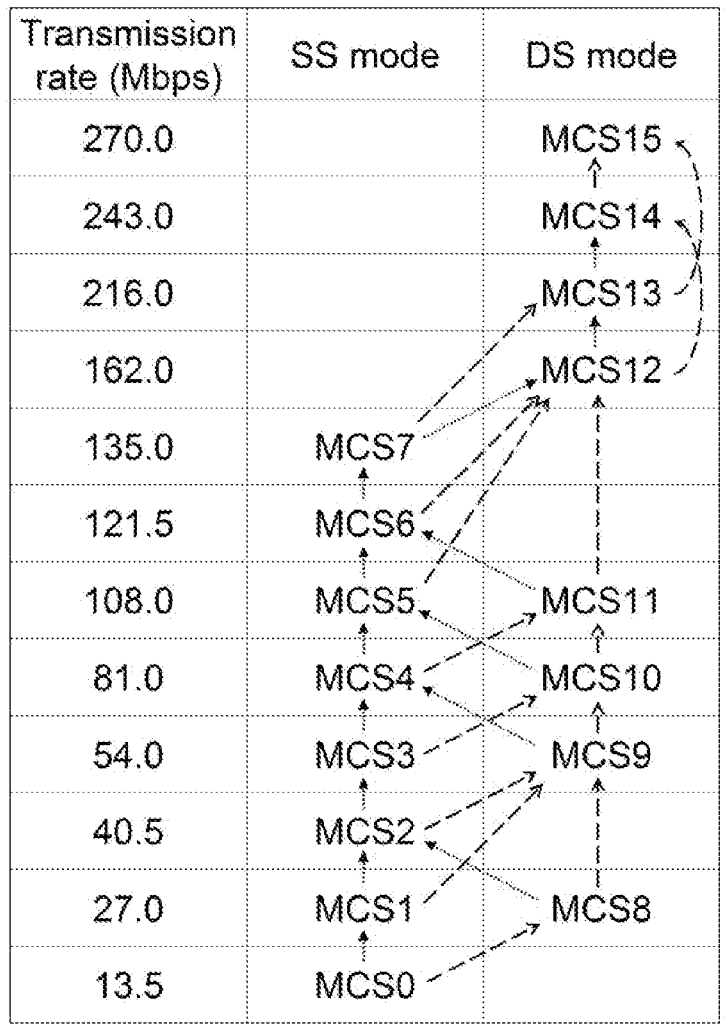
FIG. 2 illustrates how the embodiment of FIG. 1 executes a speed-up process.

In light of the above, in order to make a clear description for understanding, the present embodiment assumes that the wireless transmission device conforms to 802.11n standard and is capable of performing the MIMO operation (e.g. 2T2R MIMO operation), the transmission rate of the wireless transmission device denotes the physical layer connection rate (hereafter PHY rate), the first transmission mode is the double spatial stream mode (hereafter DS mode), the second transmission mode is the single spatial stream mode (hereafter SS mode), and the first MCS and the second MCS could be freely selected among the schemes MCS0 to MCS15. Under such assumption, an example of raising the transmission rate of the wireless transmission device in accordance with this embodiment is shown in FIG. 2. Please refer to FIG. 2, in this example, the range of the transmission rate is from 13.5 Mbps to 270.0 Mbps; each of the transmission rates of 27.0 Mbps and 54.0 Mbps to 108.0 Mbps corresponds to both the SS mode and DS mode; the arrow of the lengthy dotted line in FIG. 2 denotes selecting the first MCS for a speed-up test; and the arrow of the round dotted line denotes selecting the second MCS for the speed-up test. Since the modulation and coding rate under the DS mode will be lower than that under the SS mode provided that the transmission rates of the two modes are the same, which means that the DS mode has lower SNR requirement, the present example will preferentially choose a modulation and coding scheme of the DS mode as the first MCS to transmit one or more test packets (i.e. Step S120) when executing the method, and then if the transmission of the one or more test packets is unsuccessful with the first MCS, choose a modulation and coding scheme of the SS mode as the second MCS to transmit the one or more test packet instead (i.e. Step S140). This selection order is based on the SNR consideration and focuses on increasing the probability of a successful speed-up adjustment. Additionally, even under the same modulation and coding rate, the DS mode will have a higher transmission rate in comparison with the SS mode, which means that choosing the DS mode first also helps in improving the throughput of the wireless transmission device, and therefore the higher priority of the DS mode brings us more advantages in this example.

Please refer to FIG. 2 again. The following will give three instances of how the present example raises the transmission rate of the wireless transmission device.

Instance 1: Assuming that the original transmission rate of the wireless transmission device is 81.0 Mbps under the normal state while the corresponding modulation and coding scheme is MCS4, the wireless transmission device will enter the try state from the normal state first (Step S110); then the wireless transmission device will select the modulation and coding scheme MCS11 which is closest to MCS4 under the DS mode and has the transmission rate higher than the original transmission rate as the first MCS, transmit one or more packets of single MPDU with MCS11, and determine whether the transmission of the one or more packets is successful by a retransmission count (e.g. 1) (Step S120), which means that if a retransmission count is larger than 1, the transmission of the one or more packets is determined to be unsuccessful. Afterwards, if the wireless transmission device determines that it is able to transmit the one or more packets with MCS11, it will return to the normal state and perform the subsequent data transmission by MCS11 (Step S130); however, if the wireless transmission device is unable to transmit the one or more packets with MCS11, it will stay in the try state and select MCS5 which is closest to MCS4 under the SS mode and corresponds to a higher transmission rate as the second MCS, transmit another one or more packets of single MPDU with MCS5, and then determine whether the transmission of the another one or more packets is successful according to the same or another retransmission count (e.g. 1) (Step S140). Thereafter, if the wireless transmission device finds that it's able to transmit those single MPDU packets with MCS5 successfully, it will return to the normal state and carry out the following data transmission with MCS5 (Step S150); but if the wireless transmission device finds that it's unable to transmit those packets successfully with MCS5, it will return to the normal state and carry out the subsequent data transmission by the original transmission rate and the corresponding MCS4 thereof (Step S160).

Instance 2: Assuming that the original transmission rate of the wireless transmission device is 108.0 Mbps under the normal state while the corresponding modulation and coding scheme is MCS11, the wireless transmission device will enter the try state from the normal state first (Step S110); then the wireless transmission device will select the modulation and coding scheme MCS12 which is closest to MCS11 under the DS mode and has the transmission rate higher than the original transmission rate as the first MCS, transmit one or more packets of single MPDU with MCS12, and determine whether the transmission of the one or more packets is successful by a retransmission count (e.g. 2) (Step S120). Afterwards, if the wireless transmission device determines that it is able to transmit the one or more packets with MCS12, it will return to the normal state and perform the following data transmission by MCS12 (Step S130); however, if the wireless transmission device is unable to transmit the one or more packets with MCS12, it will select MCS6 which is closest to MCS11 under the SS mode and corresponds to a higher transmission rate as the second MCS in the try state, transmit another one or more packets of single MPDU with MCS6, and then determine whether the transmission of the another one or more packets is successful according to the same or another retransmission count (e.g. 3) (Step S140). Finally, if the wireless transmission device finds that it's able to transmit the single MPDU packets with MCS6 successfully, it will return to the normal state and carry out the following data transmission with MCS6 (Step S150); but if the wireless transmission device finds that it's unable to transmit those packets successfully with MCS6, it will still return to the normal state but carry out the subsequent data transmission by the original transmission rate and the corresponding scheme MCS11 thereof (Step S160).

Instance 3: Assuming that the original transmission rate of the wireless transmission device is 162.0 Mbps under the normal state while the corresponding modulation and coding scheme is MCS12, the wireless transmission device will enter the try state from the normal state first (Step S110); then the wireless transmission device will select the modulation and coding scheme MCS14 as the first MCS, transmit one or more packets of single MPDU with MCS14, and determine whether the transmission of the one or more packets is successful according to a retransmission count (e.g. 1) (Step S120). After that, if the wireless transmission device determines that it is able to transmit the one or more packets with MCS14, it will return to the normal state and execute the following data transmission by MCS14 (Step S130); however, if the wireless transmission device is unable to transmit the one or more packets with MCS14, it will stay under the try state and select MCS13 as the second MCS, transmit another one or more packets of single MPDU with MCS13, and then determine whether the transmission of the another one or more packets is done according to the same or another retransmission count (e.g. 1) (Step S140). Consequently, if the wireless transmission device finds that it's able to transmit the single MPDU packets with MCS13 successfully, it will return to the normal state and carry out the following data transmission with MCS13 (Step S150); but if the wireless transmission device finds that it's unable to transmit those packets successfully with MCS13, it will return to the normal state and perform the subsequent data transmission by the original transmission rate and its corresponding scheme MCS12 (Step S160). Please note that the instance 3 could be modified to directly select MCS13 as the first MCS, and return to the normal state and transmit data by the original transmission rate and its corresponding scheme MCS12 when finding that the transmission of the single MPDU packets with MCS13 has failed.

In addition to the aforementioned speed-up example of the wireless transmission device, the present embodiment also provides a speed-down example of the wireless transmission device as shown in FIG. 3. Please refer to FIG. 3, in the present example, the range of the transmission rate is still between 13.5 Mbps and 270.0 Mbps wherein each of the transmission rates 27.0 Mbps and 54.0 Mbps to 108.0 Mbps corresponds to both of the SS mode and DS mode. Comparing to the previous example preferentially choosing one of the modulation and coding schemes under DS mode as the first MCS, this example preferentially chooses the scheme of the relatively highest transmission rate which is lower than (or exceptionally equal to) and closest to the original transmission rate as the first MCS; only if the relatively highest transmission rate corresponds to schemes of the DS and SS modes simultaneously, the example preferentially chooses a scheme of the DS mode as the first MCS. Said selection rule is to optimize the throughput of the wireless transmission device, which means that choosing a higher transmission rate of the SS mode is more advantageous to the throughput than choosing a lower transmission rate of the DS mode.

Please refer to FIG. 3 again. Here are four instances to explain how the present example lowers the transmission rate of the wireless transmission device:

Instance 1: Assuming that the original transmission rate of the wireless transmission device is 81.0 Mbps under the normal state while the corresponding scheme of the original transmission rate is MCS4, the wireless transmission device will enter the try state from the normal state first (Step S110); then the wireless transmission device will select the modulation and coding scheme MCS9 of the DS mode which corresponds to the relatively highest transmission rate (i.e. 54 Mbps) lower than the original transmission rate as the first MCS, transmit one or more packets of single MPDU with MCS9, and determine whether the transmission of the one or more packets is successful according to a retransmission count (e.g. 1) (Step S120). Afterwards, if the wireless transmission device determines that it is able to transmit the one or more packets with MCS9, it will return to the normal state and perform the following data transmission by MCS9 (Step S130); however, if the wireless transmission device is unable to transmit the one or more packets with MCS9, it will stay in the try state and select MCS3 of the SS mode which also corresponds to the same relatively highest transmission rate (i.e. 54 Mbps) as the second MCS, transmit another one or more packets of single MPDU with MCS3, and then determine whether the transmission of the another one or more packets is successful according to the same or another retransmission count (e.g. 1) (Step S140). Thereafter, if the wireless transmission device finds that it's able to transmit the single MPDU packets with MCS3 successfully, it will return to the normal state and carry out the following data transmission with MCS3 (Step S150); but if the wireless transmission device finds that it's unable to transmit those packets successfully with MCS3, it will return to the normal state and carry out the subsequent data transmission with the first MCS (Step S160), i.e. MCS9, instead of the original scheme MCS4; this is because the transmission rate of MCS4 is higher than that of MCS9, and since the process is for speed-down, going back to the original scheme with the higher transmission rate will be unfavorable to the subsequent data transmission. However, in another example, the present invention allows the wireless transmission device to go back to the original transmission rate for transmission after the speed-down adjustment has failed.

Instance 2: Assuming that the original transmission rate of the wireless transmission device is 54.0 Mbps under the normal state while the corresponding scheme is MCS3, the wireless transmission device will enter the try state from the normal state first (Step S110); then the wireless transmission device will select the scheme MCS2 which corresponds to the relatively highest transmission rate (i.e. 40.5 Mbps) lower than the original transmission rate as the first MCS, transmit one or more packets of single MPDU with MCS2, and determine whether the transmission of the one or more packets is successful according to a retransmission count (e.g. 2) (Step S120). Afterwards, if the wireless transmission device determines that it is successful to transmit the one or more packets with MCS2, it will return to the normal state and perform the following data transmission by MCS2 (Step S130); however, if the wireless transmission device is unsuccessful to transmit the one or more packets with MCS2, it will stay in the try state and select MCS8 of the DS mode with the second relatively highest transmission rate as the second MCS, transmit another one or more packets of single MPDU with MCS8, and then determine whether the transmission of the another one or more packets is successful according to the same or another retransmission count (e.g. 1) (Step S140). Thereafter, if the wireless transmission device finds that it's successful to transmit the single MPDU packets with MCS8, it will return to the normal state and carry out the following data transmission with MCS8 (Step S150); but if the wireless transmission device finds that it's unsuccessful to transmit those packets with MCS8, it will return to the normal state and carry out the subsequent data transmission with the first MCS, i.e. MCS2 (Step S160).

Instance 3: Assuming that the original transmission rate of the wireless transmission device is 270.0 Mbps under the normal state while the corresponding scheme is MCS15, the wireless transmission device will enter the try state from the normal state first (Step S110); then the wireless transmission device will select the scheme MCS14 which corresponds to the relatively highest transmission rate (i.e. 243.0 Mbps) lower than the original transmission rate as the first MCS, transmit one or more packets of single MPDU with MCS14, and determine whether the transmission of the one or more packets is successful by a retransmission count (e.g. 1) (Step S120). Afterwards, if the wireless transmission device determines that it is able to transmit the one or more packets with MCS14, it will return to the normal state and perform the following data transmission by MCS14 (Step S130); however, if the wireless transmission device is unable to transmit the one or more packets with MCS14, it will stay in the try state and select MCS13 with the second relatively highest transmission rate as the second MCS, transmit another one or more packets of single MPDU with MCS13, and then determine whether the transmission of the another one or more packets is successful according to the same or another retransmission count (e.g. 1) (Step S140). Thereafter, if the wireless transmission device finds that it's successful to transmit the single MPDU packets with MCS13, it will return to the normal state and carry out the following data transmission with MCS13 (Step S150); but if the wireless transmission device finds that it's unsuccessful to transmit those packets with MCS13, it will return to the normal state and carry out the subsequent data transmission with the first MCS, i.e. MCS14 (Step S160).

Instance 4: Assuming that the original transmission rate of the wireless transmission device is 27.0 Mbps under the normal state while the corresponding scheme is MCS1, the wireless transmission device will enter the try state from the normal state first (Step S110); then the wireless transmission device will select the scheme MCS8 of the DS mode which corresponds to the transmission rate (i.e. 27.0 Mbps) equivalent to the original transmission rate as the first MCS, transmit one or more packets of single MPDU with MCS8, and determine whether the transmission of the one or more packets is successful by a retransmission count (e.g. 1) (Step S120). Afterwards, if the wireless transmission device determines that it is able to transmit the one or more packets with MCS8, it will return to the normal state and perform the following data transmission by MCS8 (Step S130); but if the wireless transmission device is unable to transmit the one or more packets with MCS8, it will stay in the try state and select the last scheme MCS0 with the second relatively highest transmission rate as the second MCS, transmit another one or more packets of single MPDU with MCS0, and then determine whether the transmission of the another one or more packets is successful according to the same or another retransmission count (e.g. 1) (Step S140). Thereafter, if the wireless transmission device finds that it's successful to transmit the single MPDU packets with MCS0, it will return to the normal state and carry out the following data transmission with MCS0 (Step S150); but if the wireless transmission device finds that it's unsuccessful to transmit those packets with MCS0, it will return to the normal state and carry out the subsequent data transmission with the first MCS, i.e. MCS8 (Step S160).

Please note that the fore-mentioned speed-down instances have the same feature indicating that the first MCS corresponds to a transmission rate equivalent to or higher than that of the second MCS. Besides, when raising the transmission rate of the wireless transmission device while the original transmission rate is associated to any of the schemes MCS0 to MCS6 and MCS8 to MCS11, the first and second transmission modes are a multiple spatial stream mode and a single spatial stream mode respectively. On the other side, when reducing the transmission rate of the wireless transmission device while the original transmission rate is associated to any of the schemes MCS13 to MCS9 and MCS7 to MCS1, the first and second transmission modes are the multiple spatial stream mode and the single spatial stream mode respectively, or the contrary.

In short, the above-described wireless transmission rate adjustment method is capable of trying the second MCS after the transmission with the first MCS has failed while the prior art can only stop trying and go back to the normal state immediately. Additionally, the adjustment method can preferentially select the first transmission mode (e.g. the DS mode) for speed-up adjustment and try the second transmission mode (e.g. the SS mode) thereafter if the adjustment under the first transmission mode has failed, so that the strike-rate is increased. Moreover, the adjustment method can select the scheme with a higher transmission rate first for speed-down adjustment rather than choosing the scheme of a preferable transmission mode, so that the throughput of the wireless transmission device can decrease gradually. At last, in order to prevent the rate adjustment from obviously slowing down the throughput of the wireless transmission device, the present method can select one or more packets of single MPDU whose size is less than that of AMPDU as the test packets, so as to keep the throughput as uninfluenced as possible.

Please note that the aforementioned embodiments, examples, and instances are for understanding, not limitations to the present invention. People of ordinary skill in the art can implement the present invention in an equivalent way according to the disclosure of this specification. For example: before the present invention tries the first MCS to execute the rate adjustment, it can use one or more other modulation and coding schemes first, which means that the present invention can try more schemes in addition to the first MCS and the second MCS in the try state; besides, the present invention can determine the order of trying the modulation and coding schemes based on other terms, e.g. always choosing the first transmission mode (such as the DS mode) preferentially, or always choosing a scheme with a higher transmission rate first; furthermore, the present invention can also use one or more AMPDU packets or other types of packets as the test packets.

Figure 4:
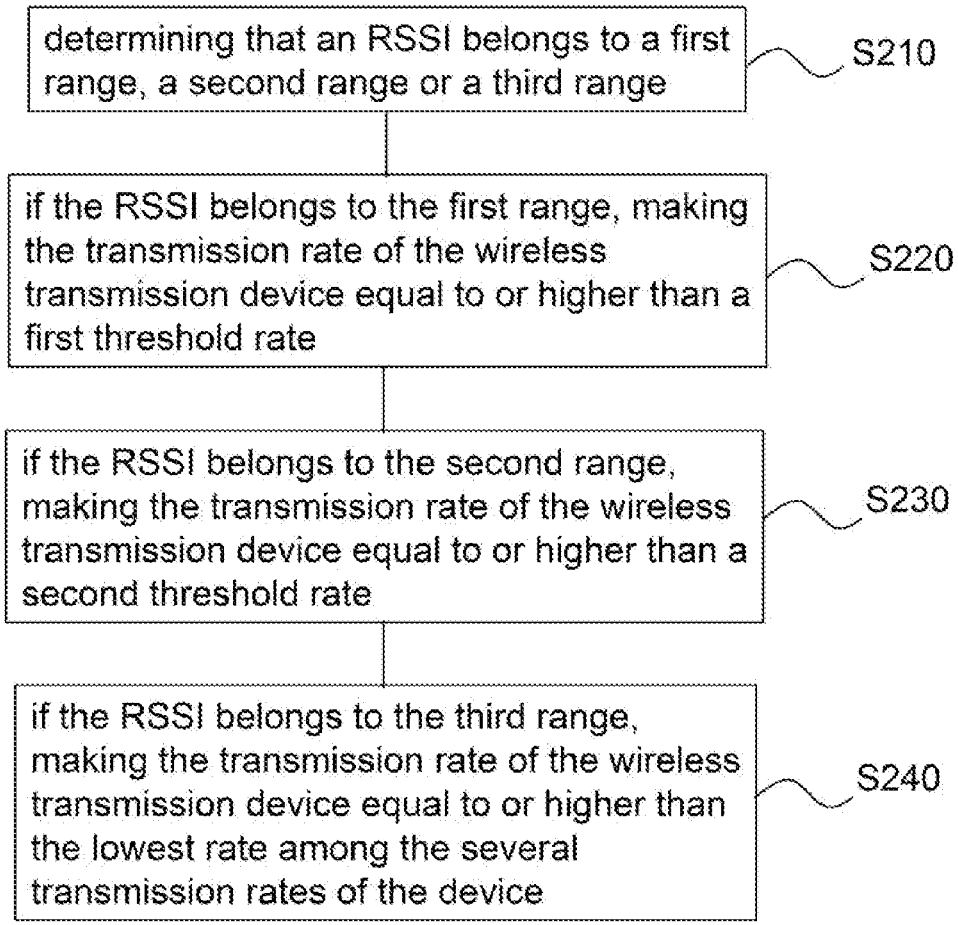
FIG. 4 illustrates the flow chart of another embodiment of the wireless transmission rate adjustment method of this invention.

Please refer to FIG. 4 which illustrates the flow chart of another embodiment of the wireless transmission rate adjustment method of the present invention. This embodiment is applicable to determining the bottom rate of a wireless transmission device which is capable of selecting one of several transmission rates (e.g. several PHY rates from 13.5 Mbps to 270.0 Mbps) to transmit data while these transmission rates correspond to a plurality of modulation and coding schemes (e.g. schemes MCS0 to MCS15), so as to avoid lowering the transmission rate unduly. More specifically, if the received signal strength is strong enough but the packet transmission failed due to collision, unduly lowering the transmission rate will make the packet length increase and packets of said device will be inclined to collide with packets of other wireless devices in the same space, which consequently leads to the transmission failure. To solve this misadjustment problem through determining the bottom rate, the wireless transmission rate adjustment method of the present embodiment comprises the following steps as shown in FIGS. 4 and 5:

Step S210: determining that a received signal strength indicator (RSSI) measured by the wireless transmission device belongs to a first range, a second range or a third range. In this embodiment, the first range including MCS5 to MCS7 and MCS11 to MCS15 is defined by the rectangle of dash dotted line having the relatively smallest range as shown in FIG. 5; the second range including MCS3 to MCS7 and MCS9 to MCS15 is defined by the rectangle of dot dotted line having the second smallest range as shown in FIG. 5; and the third range including MCS0 to MCS15 is defined by the rectangle of dash-dot dotted line having the relatively largest range as shown in FIG. 5. Please note that people of ordinary skill in the art can determine the amount and/or size of ranges in accordance with their own demands plus the disclosure the present invention; for instance: the first and second ranges could be enlarged or reduced by different requirements.

Step S220: if the RSSI belongs to the first range, making the transmission rate of the wireless transmission device equal to or higher than a first threshold rate. In this embodiment, the first threshold rate is the transmission rate 108.0 Mbps related to MCS11 and MCS5.

Step S230: if the RSSI belongs to the second range, making the transmission rate of the wireless transmission device equal to or higher than a second threshold rate which is lower than the first threshold rate. In this embodiment, the second threshold rate is the transmission rate 54.0 Mbps related to MCS9 and MCS3.

Step S240: if the RSSI belongs to the third range, making the transmission rate of the wireless transmission device equal to or higher than the lowest rate among the several transmission rates. In this embodiment, the lowest rate is the transmission rate 13.5 Mbps related to MCS0.

In light of the above, Step S210 can further comprise: setting a plurality of threshold values including a first threshold value and a second threshold value in advance for the comparison with the RSSI, so as to determine which range the RSSI belongs to. To be more specific, if the RSSI is greater than the first threshold value, the RSSI is determined to be within the first range; meanwhile, the RSSI indicates that the received signal strength is strong enough and therefore the transmission rate of the wireless transmission device should not be less than the first threshold rate (Step S220). If the RSSI is more than the second threshold value but less than the first threshold value, the RSSI is determined to be within the second range; in the meantime, the RSSI indicates that the received signal strength is medium and thus the transmission rate of the wireless transmission device should not be less than the second threshold rate (Step S230). And if the RSSI is less than the second threshold value, the RSSI is determined to be within the third range; in this case, the RSSI indicates that the received signal strength is weak and hence the transmission rate of the wireless transmission device should be equivalent to or higher than the lowest rate (Step S240).

Figure 6:
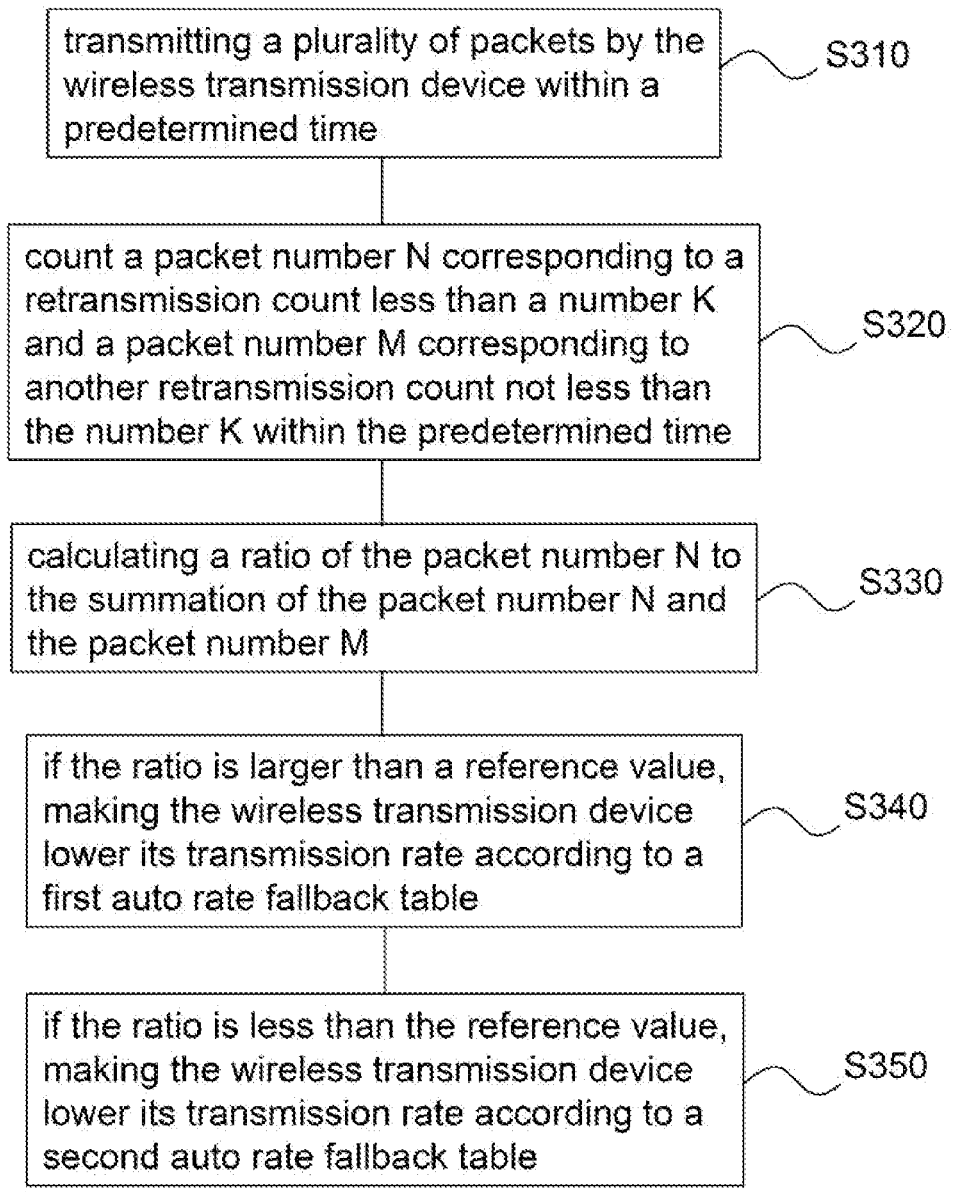
FIG. 6 illustrates the flow chart of yet another embodiment of the wireless transmission rate adjustment method of this invention.

In addition to the embodiment of FIG. 4, the present invention also provides a wireless transmission rate adjustment method to appropriately lower the transmission rate of a wireless transmission device as shown in FIG. 6. Similarly, the wireless transmission device is capable of selecting one of several transmission rates (e.g. several PHY rates from 13.5 Mbps to 270.0 Mbps) to transmit data, and these transmission rates correspond to a plurality of modulation and coding schemes (e.g. MCS0 to MCS15). Said wireless transmission rate adjustment method comprises the following steps:

Step S310: transmitting a plurality of packets by the wireless transmission device within a predetermined time. Said predetermined time could be constant or adjustable; the amount of the plurality of packets could be constant, adjustable or unrestricted.

Step S320: using the wireless transmission device to count a packet number N corresponding to a retransmission count (i.e. Rt. Cnt. in FIGS. 7a and 7b) less than a number K (e.g. K=4) and a packet number M corresponding to another retransmission count equal to or higher than the number K within the predetermined time in which the packet number N relates to the packets transmitted successfully, the packet number M relates to the packets transmitted successfully or unsuccessfully, the packet number M is equivalent to the total packet number minus the packet number N, and the same packet with any of the retransmission counts consumes only one of the packet number N or M. In the present embodiment, the N, K, M are positive integers in which the number K could be constant or adjustable.

Step S330: calculating a ratio of the packet number N to the summation of the packet number N and the packet number M. In other words, this step calculate the result of N/(N+M), that is to say, the result of N/(the number of total packets).

Step S340: if the ratio is larger than a reference value (e.g. 65% or a value between 55% and 75%), selecting a first auto rate fallback table (as shown in FIG. 7a) and making the wireless transmission device lower its transmission rate according to the first auto rate fallback table after the wireless transmission device failed in transmitting a packet (e.g. an AMPDU packet). In this embodiment, when the ratio is more than the reference value, it means that the transmission failure reason could be collision, and therefore the first auto rate fallback table is adopted to maintain the current transmission rate of the wireless transmission device as possible as it can or try to reduce the fallback degree of the transmission rate, so that the more serious collision problem induced by the lengthier packet under the lower rate could be prevented. Please note that said reference value could be constant or adjustable, and the content of the first auto rate fallback table could be modified in view of different demands.

Step S350: if the ratio is less than the reference value, selecting a second auto rate fallback table (as shown in FIG. 7b) and making the wireless transmission device lower its transmission rate according to the second auto rate fallback table after the wireless transmission device failed in packet transmission, wherein the average rate fallback degree of the second auto rate fallback table is higher than the average rate fallback degree of the first auto rate fallback table. In this embodiment, when the ratio is less than the reference value, it means that the transmission failure reason could be the insufficient SNR of a reception end receiving the packets, and thus the second auto rate fallback table is adopted to rapidly lower the transmission rate of the wireless transmission device to thereby send the packets to the reception end as soon as possible. Please also note that the content of the second auto rate fallback table could be modified in consideration of different demands.

Please refer to FIGS. 6, 7a and 7b again. The following description will give two instances to explain how the present embodiment lowers the transmission rate of the wireless transmission device:

Instance 1: Assuming that the wireless transmission device transmits 10 packets in 1 ms (Step S310) and the packet number N of the retransmission count less than the number K (e.g. 4) is 7 (Step S320), the ratio of the packet number N to the total packet number 10 (i.e. N+M) will be 70% accordingly (Step S330). If the aforementioned reference value is 65%, since the ratio 70% is more than the reference value 65%, the first auto rate fallback table (FIG. 7a) will therefore be used for speed-down (Step S340). According to the first auto rate fallback table, if the original transmission rate corresponds to MCS12 while the retransmission count of a packet is 5 or less than 5, the wireless transmission device will keep the original transmission rate and try to send the packet at the same rate continually; however, if the retransmission count is in excess of 5 to be 6, the wireless transmission device will lower the original transmission rate for one ranking from MCS12 to MCS7; furthermore, if the retransmission count is 7, the wireless transmission device will lower the original transmission rate for 3 rankings from MCS12 to MCS11; moreover, if the retransmission count is 8, the wireless transmission device will lower the original transmission rate for 5 rankings from MCS12 to MCS10, and so on and so forth.

Instance 2: Assuming that the wireless transmission device transmits 10 packets in 1 ms (Step S310) and the packet number N of the retransmission count less than the number K (e.g. 4) is 5 (Step S320), the ratio of the packet number N to the total packet number 10 (N+M) will be 50% accordingly (Step S330). If the aforementioned reference value is 55%, since the ratio 50% is less than the reference value 55%, the second auto rate fallback table (FIG. 7b) will therefore be used for speed-down (Step S340). According to the second auto rate fallback table, if the original transmission rate corresponds to MCS13 while the retransmission count of a packet is 1, the wireless transmission device will keep the original transmission rate and try to send the packet at the same rate again; but if the retransmission count is in excess of 1 to be 2, the wireless transmission device will lower the original transmission rate for one ranking from MCS13 to MCS12; furthermore, if the retransmission count is 4, the wireless transmission device will lower the original transmission rate for 4 rankings from MCS13 to MCS9 (54 Mbps); moreover, if the retransmission count is 5, the wireless transmission device will lower the original transmission rate for 6 rankings from MCS13 to MCS7 (134 Mbps).

Please note that the above-mentioned parameters (e.g. the predetermined time, the number of the plurality of packets, the number K, the number N, the number M, the reference value, the contents of the first and second auto rate fallback tables, the amount of fallback tables) are exemplary, which means that people of ordinary skill in the art can set or modify these parameters on their own according to the disclosure of this specification and their requirements. Hence, different but similar examples will be omitted for conciseness.

Figure 8:
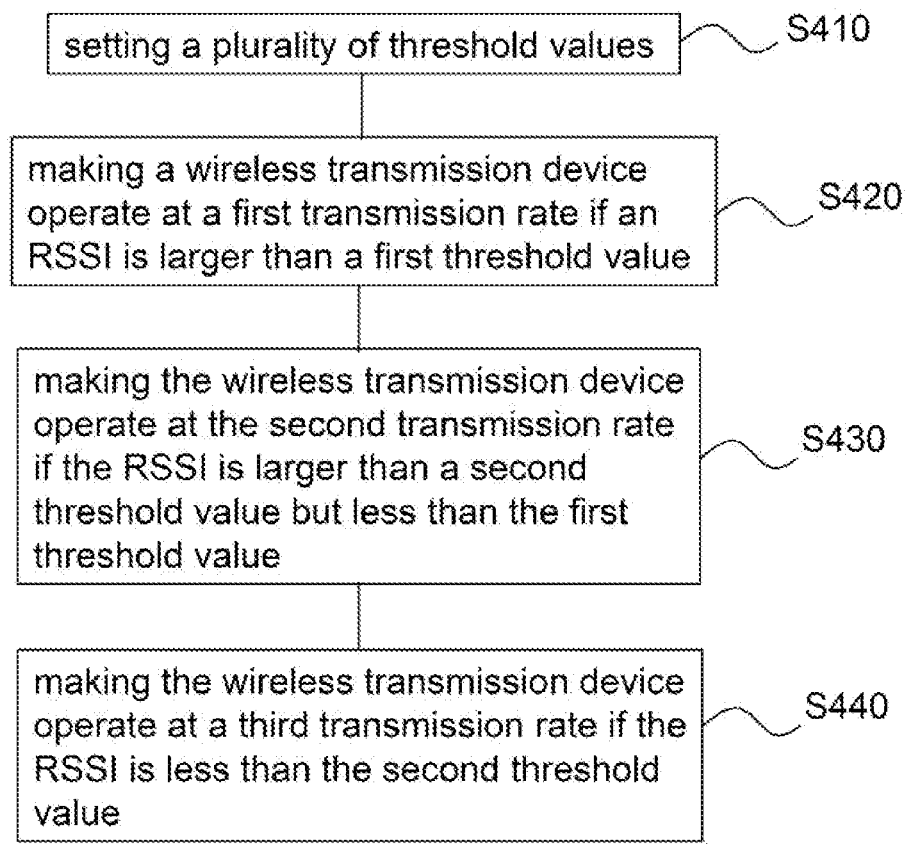
FIG. 8 illustrates the flow chart of yet another embodiment of the wireless transmission rate adjustment method of this invention.

Please refer to FIG. 8 which illustrates the flow chart of another embodiment of the wireless transmission rate adjustment method of the present invention. This embodiment is applicable to choosing the initial transmission rate of a wireless transmission device which is capable of selecting one of several transmission rates (e.g. several PHY rates from 13.5 Mbps to 270.0 Mbps) to transmit data while these transmission rates corresponds to a plurality of modulation and coding schemes (e.g. schemes MCS0 to MCS15), so that the wireless transmission device can rapidly pick an appropriate transmission rate (e.g. the original transmission rate of FIG. 1) to start data transmission or rate adjustment. As shown in FIG. 8, the wireless transmission rate adjustment method of the present embodiment comprises the following steps:

Step S410: setting a plurality of threshold values including a first threshold value corresponding to a first transmission rate of the several transmission rates and a second threshold value corresponding to a second transmission rate of the several transmission rates. In this embodiment, the first transmission rate is 270.0 Mbps corresponding to MCS15 and the second transmission rate is 108.0 Mbps corresponding to MCS11.

Step S420: comparing a received signal strength indicator (RSSI) detected by the wireless transmission device with the first threshold value, and making the wireless transmission device operate at the first transmission rate if the RSSI is larger than the first threshold value.

Step S430: comparing the RSSI with the second threshold value, and making the wireless transmission device operate at the second transmission rate which is less than the first transmission rate if the received signal strength indicator is larger than the second threshold value but less than the first threshold value.

In light of the above, the present embodiment can further comprises a step as follows:

Step S440: comparing the RSSI with the second threshold value, and making the wireless transmission device operate at a third transmission rate of the several transmission rates if the RSSI is less than the second threshold value. In this embodiment, the third transmission rate is 27.0 Mbps corresponding to MCS8, which is less than the second transmission rate 108.0 Mbps.

Please note that the amount of threshold values, the value of each threshold value and its corresponding transmission rate and modulation and coding scheme can be modified. Since such modification could be done by one of ordinary skill in the art without undue effort according to the disclosure in this specification, similar or redundant description is therefore omitted here for conciseness.

To sum up, the wireless transmission rate adjustment method of the present invention can accelerate the rate adjustment process, adaptively modify the rate in consideration of different factors such as collision and SNR, and use RSSI to determine an initial transmission rate to perform subsequent data transmission or rate adjustment. As a result, the present invention can improve the transmission performance of a wireless transmission device.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A wireless transmission rate adjustment method to adjust the wireless transmission rate of a wireless transmission device which is capable of selecting one of several transmission rates to transmit data in which at least one of the several transmission rates corresponds to multiple transmission modes including a first transmission mode and a second transmission mode, comprising:

having the wireless transmission device enter a try state from a normal state in which the wireless transmission device transmits data at an original transmission rate before entering the try state;

under the try state, having the wireless transmission device transmit one or more test packets according to a first modulation and coding scheme (MCS), and determining whether the wireless transmission device transmits the one or more test packets successfully according to a predetermined condition;

if the transmission of the one or more test packets is successful with the first MCS, having the wireless transmission device return to the normal state and transmit data with the first MCS;

if the transmission of the one or more test packets is unsuccessful with the first MCS, having the wireless transmission device transmit another one or more test packets according to a second MCS in the try state, and determining whether the wireless transmission device transmits the another one or more test packets successfully in accordance with the predetermined condition;

if the transmission of the another one or more test packets is successful with the second MCS, having the wireless transmission device return to the normal state and transmit data with the second MCS; and if the transmission of the another one or more test packets is failed with the second MCS, having the wireless transmission device return to the normal state and transmit data at the original transmission rate or with the first MCS, wherein at least one of the transmission rates of the first MCS and the second MCS is different from the original transmission rate, the first MCS corresponds to the first transmission mode while the second MCS corresponds to the second transmission mode, and if the transmission rate of the first MCS is higher than the original transmission rate, the first transmission mode is a multiple spatial stream mode and the second transmission mode is a single spatial stream mode.

2. The wireless transmission rate adjustment method of claim 1, wherein the transmission rate of the first MCS is equal to or higher than the transmission rate of the second MCS.

3. The wireless transmission rate adjustment method of claim 1, wherein if the transmission rate of the first MCS is lower than the original transmission rate, the first transmission mode is one of a multiple spatial stream mode and a single spatial stream mode while the second transmission mode is the other one of the multiple and single spatial stream modes.

4. The wireless transmission rate adjustment method of claim 1, wherein the predetermined condition includes a retransmission count.

5. The wireless transmission rate adjustment method of claim 1, wherein the types of the test packets are single MAC protocol data unit (MPDU).

6. A wireless transmission rate adjustment method to adjust the wireless transmission rate of a wireless transmission device which is capable of selecting one of several transmission rates to transmit data in which at least one of the several transmission rates corresponds to multiple transmission modes including a first transmission mode and a second transmission mode, comprising:

having the wireless transmission device enter a try state from a normal state in which the wireless transmission device transmits data at an original transmission rate before entering the try state;

under the try state, having the wireless transmission device transmit one or more test packets according to a first modulation and coding scheme (MCS), and determining whether the wireless transmission device transmits the one or more test packets successfully according to a predetermined condition;

if the transmission of the one or more test packets is successful with the first MCS, having the wireless transmission device return to the normal state and transmit data with the first MCS;

if the transmission of the one or more test packets is unsuccessful with the first MCS, having the wireless transmission device transmit another one or more test packets according to a second MCS in the try state, and determining whether the wireless transmission device transmits the another one or more test packets successfully in accordance with the predetermined condition;

if the transmission of the another one or more test packets is successful with the second MCS, having the wireless transmission device return to the normal state and transmit data with the second MCS; and if the transmission of the another one or more test packets is failed with the second MCS, having the wireless transmission device return to the normal state and transmit data at the original transmission rate or with the first MCS, wherein at least one of the transmission rates of the first MCS and the second MCS is different from the original transmission rate; the MCS order of the first MCS and the MCS order of the original transmission rate are not successive provided that the transmission rates of the first MCS and the second MCS are the same; the MCS order of the first MCS and the MCS order of the original transmission rate are not successive provided that the transmission rate of the first MCS is greater than the transmission rate of the second MCS and greater than the original transmission rate; and the MCS order of the second MCS and the MCS order of the original transmission rate are not successive or associated with the same mode of the multiple transmission modes provided that the transmission rate of the first MCS is greater than the transmission rate of the second MCS and not greater than the original transmission rate.

7. A wireless transmission rate adjustment method to lower the transmission rate of a wireless transmission device which is capable of selecting one of several transmission rates to transmit data, comprising:

transmitting a plurality of packets by the wireless transmission device within a predetermined time;

using the wireless transmission device to count a packet number N corresponding to a first retransmission count less than a number K and count a packet number M corresponding to a second retransmission count equal to or higher than the number K within the predetermined time in which the packet number N relates to packet(s) transmitted successfully within the predetermined time and the packet number M is equivalent to the number of total packets minus the packet number N;

calculating a ratio of the packet number N to the summation of the packet number N and the packet number M;

if the ratio is larger than a reference value, selecting a first auto rate fallback table and making the wireless transmission device lower its transmission rate according to the first auto rate fallback table; and if the ratio is less than the reference value, selecting a second auto rate fallback table and making the wireless transmission device lower its transmission rate according to the second auto rate fallback table, wherein the average rate fallback degree of the second auto rate fallback table is higher than the average rate fallback degree of the first auto rate fallback table.

8. A wireless transmission rate adjustment method to adjust the wireless transmission rate of a wireless transmission device which is capable of selecting one of several transmission rates to transmit data in which at least one of the several transmission rates corresponds to multiple transmission modes including a first transmission mode and a second transmission mode, comprising:

having the wireless transmission device enter a try state from a normal state in which the wireless transmission device transmits data at an original transmission rate before entering the try state;

under the try state, having the wireless transmission device transmit one or more test packets according to a first modulation and coding scheme (MCS), and determining whether the wireless transmission device transmits the one or more test packets successfully according to a predetermined condition;

if the transmission of the one or more test packets is successful with the first MCS, having the wireless transmission device return to the normal state and transmit data with the first MCS;

if the transmission of the one or more test packets is unsuccessful with the first MCS, having the wireless transmission device transmit another one or more test packets according to a second MCS in the try state, and determining whether the wireless transmission device transmits the another one or more test packets successfully in accordance with the predetermined condition;

if the transmission of the another one or more test packets is successful with the second MCS, having the wireless transmission device return to the normal state and transmit data with the second MCS; and if the transmission of the another one or more test packets is failed with the second MCS, having the wireless transmission device return to the normal state and transmit data at the original transmission rate or with the first MCS, wherein at least one of the transmission rates of the first MCS and the second MCS is different from the original transmission rate, the first MCS corresponds to the first transmission mode while the second MCS corresponds to the second transmission mode, and if the transmission rate of the first MCS is lower than the original transmission rate, the first transmission mode is one of a multiple spatial stream mode and a single spatial stream mode while the second transmission mode is the other one of the multiple and single spatial stream modes.

\* \* \* \* \*